(12) United States Patent
Terrell, Jr.

(10) Patent No.: US 6,408,651 B1
(45) Date of Patent: Jun. 25, 2002

(54) METHOD OF MANUFACTURING OPTICAL FIBERS USING THERMOPILES TO MEASURE FIBER ENERGY

(75) Inventor: James P. Terrell, Jr., Ithaca, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 09/489,557

(22) Filed: Jan. 21, 2000

Related U.S. Application Data

(60) Provisional application No. 60/174,009, filed on Dec. 30, 1999.

(51) Int. Cl.$^7$ .............................................. C03B 37/07
(52) U.S. Cl. .............................. 65/377; 65/384; 65/488
(58) Field of Search ........................... 65/377, 384, 488

(56) References Cited

U.S. PATENT DOCUMENTS

| | | | | |
|---|---|---|---|---|
| 2,116,450 A | | 5/1938 | Richardson et al. .......... 236/15 |
| 3,430,492 A | * | 3/1969 | Matsumoto ................. 136/224 |
| 3,465,589 A | * | 9/1969 | Flook ........................ 374/129 |
| 3,525,260 A | * | 8/1970 | Kung ......................... 136/214 |
| 3,820,967 A | | 6/1974 | Johnson ........................ 65/2 |
| 4,043,780 A | | 8/1977 | Bricker et al. ................. 65/29 |
| 4,102,196 A | * | 7/1978 | Holtermann ................ 136/214 |
| 4,185,982 A | | 1/1980 | Schwenninger ................ 65/29 |
| 4,256,477 A | | 3/1981 | Moody ........................... 65/2 |
| 4,285,712 A | | 8/1981 | Thompson ...................... 65/2 |
| 4,498,789 A | | 2/1985 | Kiss et al. ................... 374/164 |
| 4,541,728 A | | 9/1985 | Hauser et al. ................ 374/29 |
| 4,595,299 A | | 6/1986 | Lindwall et al. ............ 374/120 |
| 4,657,572 A | | 4/1987 | Desai et al. ..................... 65/1 |
| 4,679,948 A | | 7/1987 | Hempowitz et al. ......... 374/129 |
| 4,718,930 A | | 1/1988 | Gartner et al. ................... 65/6 |
| 4,779,994 A | | 10/1988 | Diller et al. .................. 374/29 |
| 4,794,625 A | | 12/1988 | Grundy ........................ 373/28 |
| 4,850,713 A | | 7/1989 | Thery et al. .................. 374/30 |
| 4,856,911 A | | 8/1989 | Roth et al. .................. 374/135 |
| 4,863,662 A | * | 9/1989 | Hasegawa et al. .......... 264/130 |
| 4,925,473 A | | 5/1990 | Jeskey et al. .................. 65/12 |
| 5,259,857 A | | 11/1993 | Pasquier et al. ................. 65/6 |
| 5,294,200 A | * | 3/1994 | Rall ........................... 374/120 |
| 5,410,567 A | | 4/1995 | Brundage et al. ........... 373/137 |
| 5,620,493 A | | 4/1997 | Arterburn .................... 65/377 |
| 5,785,728 A | | 7/1998 | Varrasso et al. ............. 65/384 |
| 5,928,574 A | * | 7/1999 | DiMarcello et al. ......... 264/1.1 |
| 6,232,583 B1 | * | 5/2001 | Uhm .......................... 219/494 |

FOREIGN PATENT DOCUMENTS

| | | | | |
|---|---|---|---|---|
| EP | 0 275 410 A1 | | 7/1988 | .......... C03B/37/07 |
| EP | 0 277 585 A2 | | 8/1988 | .......... C03B/37/08 |
| EP | 0 322 176 A2 | | 6/1989 | .......... G01K/13/06 |
| EP | 0 426 517 A1 | | 5/1991 | .......... G01K/13/04 |
| EP | 0 563 489 A1 | | 10/1993 | .......... G01K/13/04 |
| EP | 0 631 120 A1 | | 12/1994 | .......... G01K/13/06 |
| EP | 0 756 161 A1 | | 1/1997 | .......... G01K/13/04 |
| GB | 1552793 | | 9/1979 | .......... G01K/13/06 |
| JP | 60-16377 | * | 4/1985 | .................. 65/384 |
| JP | 3-37129 | * | 2/1991 | .................. 65/384 |
| WO | 82/02888 | | 9/1982 | .......... C03B/37/025 |
| WO | 89/00309 | | 1/1989 | .......... G05D/23/22 |
| WO | 99/40400 | | 8/1999 | .......... G01K/13/06 |

* cited by examiner

Primary Examiner—John Hoffmann
(74) Attorney, Agent, or Firm—Silvy A. Murphy; Randall S. Wayland

(57) ABSTRACT

An apparatus and method of manufacturing optical waveguides that comprises non-optically measuring the average temperature of a moving optical waveguide fiber as it exits a heated draw furnace using a temperature device. The device comprises an enclosed chamber that has a plurality of differential thermopiles secured to the inside surface, and a cooling system that substantially maintains a reference surface temperature of one end of each of the thermopiles. Each of the thermopiles are serially interconnected, whereby, in response to a maximum amount of radiant energy absorbed, the thermopiles generate an output signal. The output signal is substantially proportional to the maximum amount of radiant energy absorbed by the thermopiles, which in turn is substantially proportional to the fourth power of the average temperature of the moving optical waveguide fiber within the chamber.

9 Claims, 6 Drawing Sheets

METHOD OF MANUFACTURING OPTICAL FIBERS USING THERMOPILES TO MEASURE FIBER ENERGY

This application claims priority from Provisional application Ser. No. 60/174,009, filed Dec. 30, 1999.

FIELD OF THE INVENTION

The invention relates to an apparatus and method of manufacturing optical waveguides which comprises non-optically measuring the average temperature of a moving optical waveguide as it exits a heated draw furnace that is heated to a draw temperature. In particular, the apparatus comprises a chamber having a plurality of differential thermopiles to generate an output signal that is representative of a maximum amount of radiant energy radiated by the optical waveguide fiber within the chamber. While the invention may be used in manufacturing other types of optical waveguides, it is especially suited for use in manufacturing silica optical waveguides, and will be particularly described in that connection.

BACKGROUND OF THE INVENTION

An optical waveguide fiber is manufactured by drawing the optical waveguide fiber vertically from a heated optical waveguide preform located within a draw furnace. Because the moving optical waveguide fiber being drawn is at a high temperature of about 1500° C. to 1800° C., and due to the small diameter (about 125 microns) of the optical waveguide fiber, non-contact temperature measurement is a preferred choice with such a small, moving or inaccessible optical waveguide. One non-contact way of measuring the temperature of an optical waveguide fiber is the use of radiation thermometers.

Temperature measurement with a radiation thermometer is based on the fact that all objects emit radiant energy. Radiant energy is emitted in the form of electromagnetic waves, considered to be a stream of photons traveling at the speed of light. The wavelengths of radiant energy emitted by a hot object range from the ultraviolet, 0.1 micron to the far infrared, 100 microns. However, the majority of the energy radiated by an object between 1500° C. and 1800° C. is in the near infrared region, 1.0 to 2.0 microns. Radiation thermometers measure the temperature of an object, such as an optical waveguide, by measuring the amount of thermal electromagnetic radiation received from a spot on the object whose temperature is being measured. The intensity and wavelengths of the radiation emitted by an object depends on the emissivity and the temperature of the object. Emissivity is a measure of an object's ability to emit radiant energy. The emissivity of an object is the ratio of energy emitted while at a particular temperature to that of a perfect emitter or "blackbody" at the same temperature. Since emittance will differ from one object to another, a standard, called a blackbody, is used as a reference for calibrating radiation thermometers and serves as the basis for the laws that define the relationship of the intensity of radiation and wavelength with temperature. A blackbody is an object having a surface that does not reflect or pass radiation. It is considered a perfect emitter because it absorbs all electromagnetic radiation to which it is exposed and re-emits the maximum spectral radiation allowed by Plank's law. The intensity of radiant energy increases as temperature increases. Thus, such devices are capable of measuring the temperature by measuring the intensity of the radiation that the object emits.

A radiation thermometer consists of optical lenses that collect and focus the radiant energy emitted by an object, and a radiation detector/sensor converts the focused radiant energy into an electrical signal and an indicator provides a readout of the measurement. A disadvantage of radiation thermometers is that they require a prior knowledge of the optical properties of the object being measured and, more specifically, the emissivity, $\in$ of the object. Thermal radiation by an object always contains stray radiation emitted by the environment surrounding the object area and reflected by the object's surface. Hence, to maintain high measurement accuracy of a radiation thermometer precise compensation/adjustment is necessary. For example, a radiation thermometer that is sensitive to energy in the wavelength range from 4.9 $\mu$m to 5.5 $\mu$m with a spot size or field of view of 1.1 mm does not yield accurate temperature data when attempting to measure the temperature of a 0.125 mm diameter optical fiber for several reasons. First, the accuracy of a radiation thermometer is a function of the emissivity of the fiber within the sensitive wavelength range of the radiation thermometer, namely, 4.9 $\mu$m to 5.5 $\mu$m. Emissivity is the ratio of the emitted radiation by an object at specific wavelengths and temperature to the emitted radiation from a blackbody at the same wavelengths and temperature and unfortunately emissivity can be temperature and geometry dependent. The object, in this case is an optical waveguide fiber, which is made primarily of silica. Silica is partially transparent to radiation at wavelengths shorter than approximately 8 microns for certain thicknesses. Also, the effect of the cylindrical geometry of the fiber on its emissivity is not well understood. The above mentioned emissivity uncertainties along with the fact that the fiber occupies approximately only 15% of the thermometer's field of view as well as vibrating in and out of the field of view make any attempt to measure it's temperature using a radiation thermometer unreliable. One version of a radiation thermometer attempts to overcome the vibrating fiber issue by using a panning mirror that pans an area looking for the optical waveguide fiber and recording the peak temperatures over time. Thus, when the temperature peaks, it is assumed that the optical waveguide fiber is occupying the maximum 15% of the field of view however the effective emissivity of the fiber is not known and therefore cannot be entered into the thermometer. Another disadvantage of radiation thermometers is that they are quite expensive.

In light of the foregoing, it is desirable to provide an apparatus and method of accurately measuring the temperature of a moving optical waveguide. In addition, it is desirable to provide an apparatus and method that minimizes any stray radiation and/or ambient temperature changes from effecting the temperature measurement of the optical waveguide. Further, it is desirable to provide an apparatus that is rugged and capable of withstanding high temperatures, as well as an apparatus that can consistently provide an accurate average temperature measurement and has a fast response time. A further object of the invention is to provide a reliable method of manufacturing silica glass optical waveguides, while reliably monitoring and controlling the temperature of the waveguide during the manufacturing process. Finally, it is desirable to provide an apparatus that is relatively inexpensive to manufacture.

SUMMARY OF THE INVENTION

Accordingly, the present invention is directed to an apparatus and method of manufacturing optical waveguides that comprises non-optically measuring the average temperature of a moving optical waveguide fiber as it exits a heated draw furnace using a temperature device or monitor. In particular, the invention provides an apparatus and method of measuring an average temperature of a moving optical waveguide, where the radiant energy emitted by the moving optical waveguide is non-optically processed by the temperature device. The invention provides an optical waveguide temperature monitor and a method of measuring the average temperature of a moving optical waveguide by non-optically detecting the radiant energy emitted by the moving optical waveguide and non-optically measuring the heat flux radiated by the moving optical waveguide within a chamber that is adapted to receive the moving optical waveguide through a central channel. The principal advantage of the present invention is the provision of an arrangement that overcomes the limitations and disadvantages of the described prior arrangements. Additional features and advantages of the invention will be set forth in the description that follows, and in part will be apparent from the description, or may be learned by practice of the invention. The objectives and other advantages of the invention will be realized and attained by the apparatus particularly pointed out in the written description and claims hereof as well as the appended drawings.

In accordance with one embodiment, the present invention is a temperature device or monitor used for manufacturing an optical waveguide. The temperature device comprises a thermally isolated chamber having a plurality of side walls and a central channel that traverses the chamber from a top wall to a bottom wall, where the chamber is adapted to receive through the central channel the optical waveguide fiber being drawn. The device further comprises a plurality of heat flux sensors, which in a preferred embodiment are differential thermopiles that are secured to the inner surface of the side walls of the chamber. A first surface of each of the heat flux sensors that faces the central channel has a dark absorptive surface, which is exposed to the thermal energy radiated by the optical waveguide fiber, whereas, a second surface of each of the heat flux sensors is thermally isolated from the first surface and is in thermal contact with the side walls of the chamber. The temperature monitor further comprises a cooling system that is in thermal contact with the side walls, preferably, built into the side walls of the chamber. The cooling system is adapted to substantially maintain the reference surface temperature $T_s$ of the side walls of the chamber. Thus, since the second surface of each of the heat flux sensors is in thermal contact with the side walls, the second surface is substantially maintained at the reference surface temperature of $T_s$ by the cooling system. As such, a temperature gradient develops between the first and second surfaces of the heat flux sensors and this temperature gradient is translated into an output/voltage signal that is proportional to the thermal/radiant energy absorbed or the heat flux measured by all of the heat flux sensors. Based on the amount of heat flux absorbed by the heat flux sensors, the average temperature of the optical waveguide fiber can be determined. Also, each of the heat flux sensors is serially interconnected to generate an aggregate output signal that is substantially proportional to a maximum amount of radiant energy absorbed by all of the heat flux sensors within the chamber. Further, each of the heat flux sensors has an electrode that is connected to a measuring device or readout instrument that registers an aggregate output signal generated by all the heat flux sensors. The output signal is proportional to the thermal/radiant energy absorbed by each of the heat flux sensors. In a preferred embodiment, the measuring device is a voltmeter.

In another embodiment, the invention provides an optical waveguide fiber manufacturing device. The manufacturing device comprises of a draw furnace heated to a draw temperature, and an optical waveguide preform positioned within the draw furnace, where the optical waveguide preform is heated to the draw temperature. The manufacturing device further comprises a temperature monitor for non-contact and non-optical measurement of an average temperature $T_f$ of an optical waveguide fiber being drawn from the heated optical waveguide preform. The temperature monitor is in alignment with and downstream from the draw furnace. The temperature monitor (see comprises a thermally isolated chamber having a plurality of side walls and a central channel that traverses the chamber from a top wall to a bottom wall, where the chamber is adapted to receive through the central channel the optical waveguide fiber being drawn from the optical waveguide preform. The chamber has a plurality of heat flux sensors, with each of the heat flux sensors being mounted onto an inner surface of each of the side walls of the chamber. Preferably, each of the heat flux sensors is serially interconnected to generate an aggregate output signal that is substantially proportional to a maximum amount of radiant energy absorbed by all of the heat flux sensors within the chamber. The aggregate output signal is preferably substantially proportional to the average optical waveguide fiber temperature $T_f$ of a length of the optical waveguide fiber within the chamber. Further, the maximum amount of radiant energy absorbed from the optical waveguide fiber within the chamber is substantially proportional to the fourth power of the average temperature $T_f$ of the length of the optical waveguide fiber within the chamber. The temperature monitor further includes a cooling system that is in thermal contact with each of the side walls of the chamber. The cooling system is adapted to substantially maintain a reference surface temperature $T_s$ of each of the side walls of the chamber.

In another aspect, the invention provides a method of manufacturing an optical waveguide fiber, where the method comprises the steps of providing an optical waveguide preform, and heating the optical waveguide preform to a draw temperature, and then drawing an optical waveguide fiber from the heated optical waveguide preform. The method further includes providing a heat flux chamber having an optical waveguide fiber entrance and an optical waveguide fiber exit, and passing the drawn optical waveguide fiber through the entrance and out the exit of the chamber. Finally the method includes the step of non-optically measuring the heat flux radiated by the optical waveguide fiber within the chamber. Preferably, the step of non-optically measuring includes the steps of serially interconnecting an array of heat flux sensors to an inner surface of a plurality of side walls of the heat flux chamber, and providing a cooling system that is in thermal contact with the plurality of side walls of the heat flux chamber, where the cooling system is adapted to substantially maintain a reference surface temperature of each of the heat flux sensors. The method further comprises adjusting the draw temperature based on a measured heat flux of the of optical waveguide fiber within the chamber, where the measured heat flux is proportional to the fourth power of an average temperature of a length of the optical waveguide fiber within the chamber.

In yet another embodiment, the invention provides a method of measuring an average temperature $T_f$ of an optical waveguide fiber that is being drawn from a heated optical waveguide preform in a draw furnace. The method comprises the step of providing a chamber having a plurality of side walls and a central channel that traverses the chamber from a top wall to a bottom wall. The method also includes the steps of serially interconnecting a plurality of differential thermocouple pairs onto a substrate to form a differential thermopile, and securely fixing each of the differential thermopiles to an inner surface of each of the side walls of the chamber. Further, the method includes serially interconnecting each of the differential thermopiles to a readout instrument that indicates the aggregate output signal generated by the differential thermopiles, the aggregate output signal being representative of the maximum amount of radiant energy absorbed by the differential thermopiles within the chamber. The method includes the step of passing the optical waveguide fiber being drawn through a central channel in the chamber. The method further includes the steps of maintaining a reference surface temperature $T_s$ of one surface in each of a plurality of differential thermopiles, where each of the differential thermopiles is fixed to an inner surface of the side chamber with the one surface of each of the differential thermopiles being in thermal contact with the side walls of the chamber. The method further includes generating an aggregate output signal representative of a maximum amount of radiant energy absorbed by the differential thermopiles within the chamber. The method further includes, providing a cooling system that is in thermal contact with the side walls of the chamber, where the cooling system is adapted to substantially maintain a reference surface temperature $T_s$ of the one surface of the differential thermopiles. The method also includes providing within the side walls of the chamber a plurality of channels that are adapted to receive a coolant from an external chiller that maintains the coolant at the temperature $T_s$. Also, in a preferred embodiment, the method includes a first thermocouple of each of the differential thermocouple pairs from a second thermocouple, with the first thermocouple being exposed to the radiant energy radiating from the optical waveguide fiber and with the second thermocouple being in thermal contact with the inner surface of the side walls of the chamber. In a preferred embodiment, the method includes providing a chamber that is made of aluminum.

It is to be understood that both the foregoing general description and the following detailed description are exemplary and explanatory and are intended to provide further explanation of the invention as claimed.

The accompanying drawings are included to provide a further understanding of the invention and are incorporated in and constitute a part of this specification, illustrating embodiments of the invention, and together with the description serve to explain the objects, advantages, and principles of the invention.

DESCRIPTION OF THE INVENTION

Figure 1:
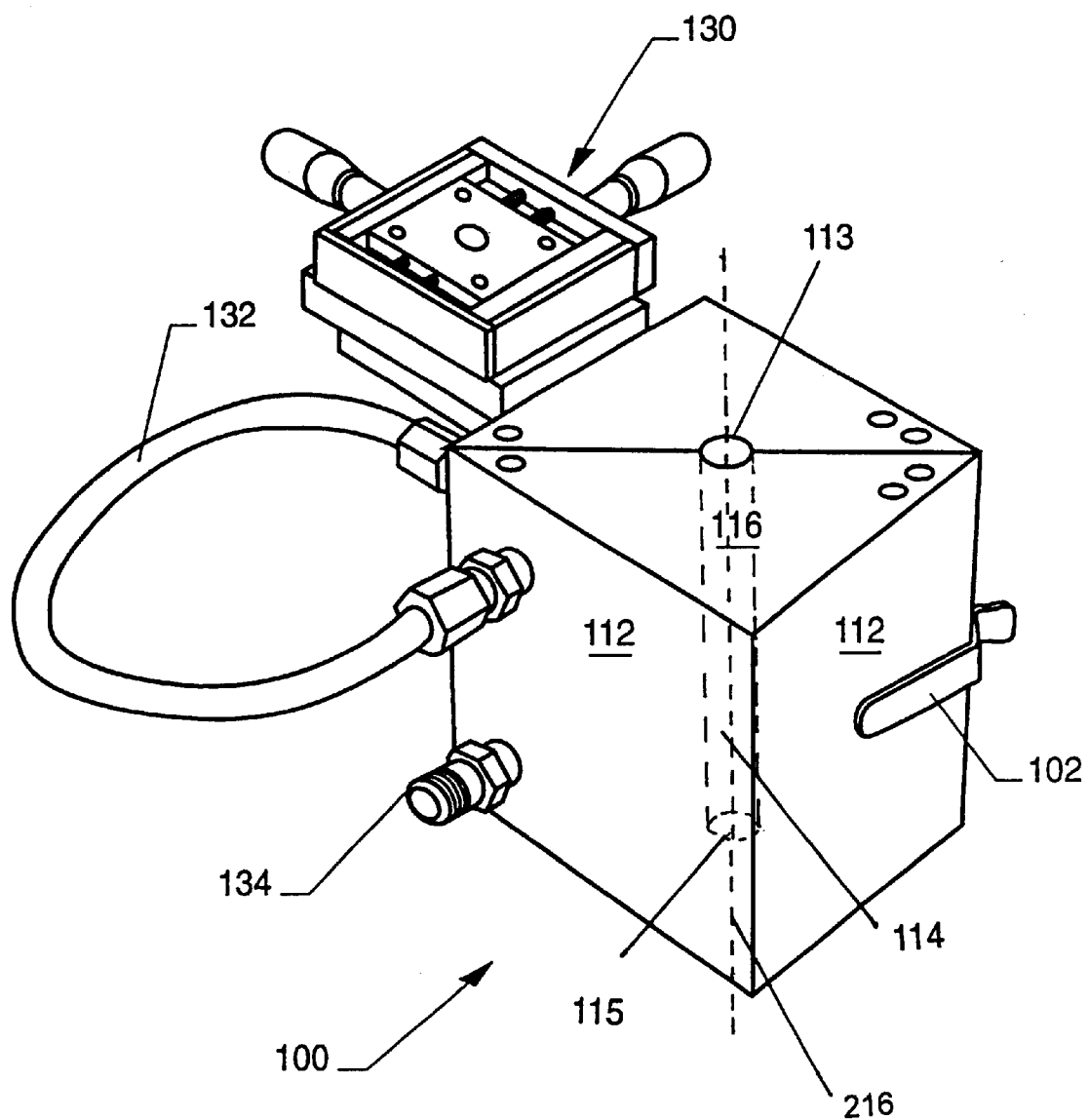
FIG. 1 is a perspective view showing an optical waveguide temperature monitor in accordance with the present invention.
Figure 2:
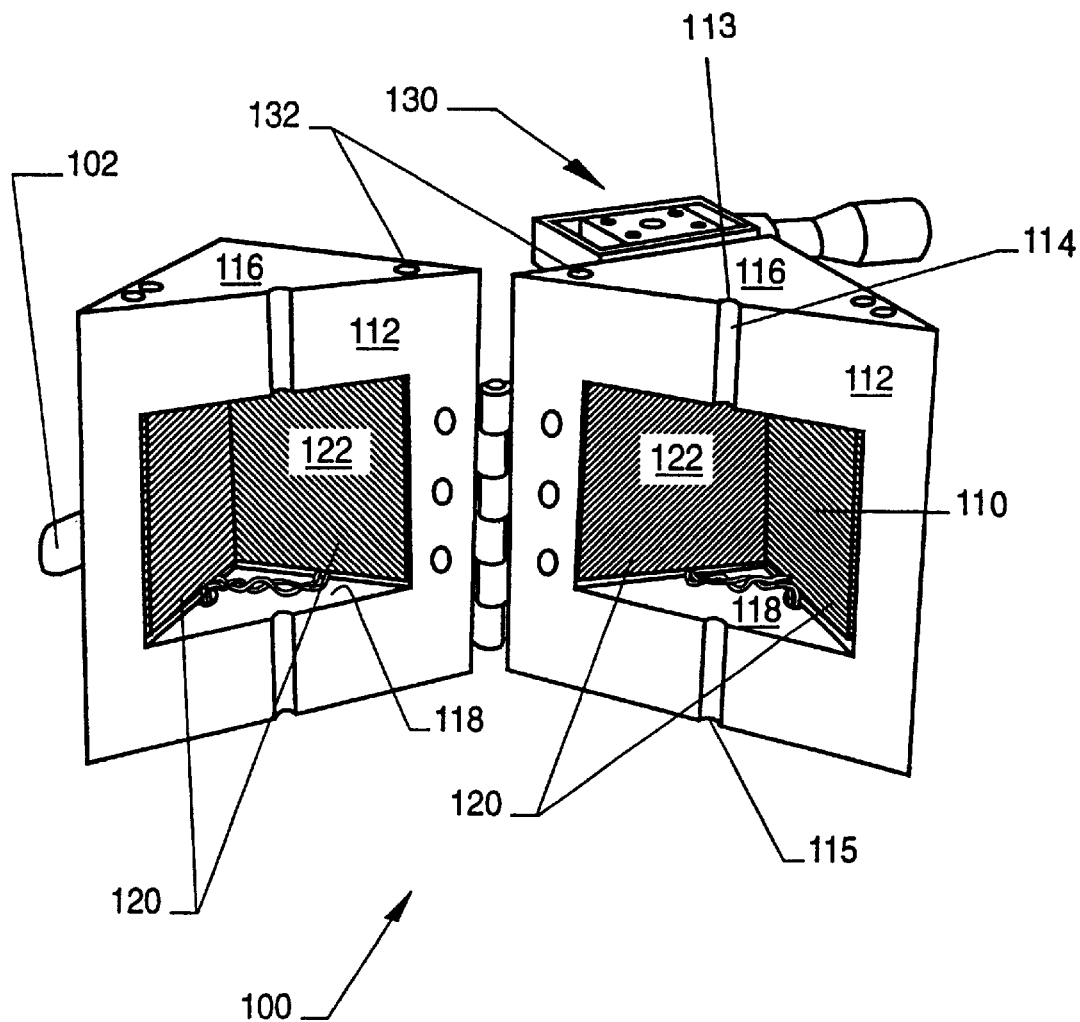
FIG. 2 is a perspective view of the optical waveguide temperature monitor of FIG. 1 showing the interior of the device.
Figure 3A:
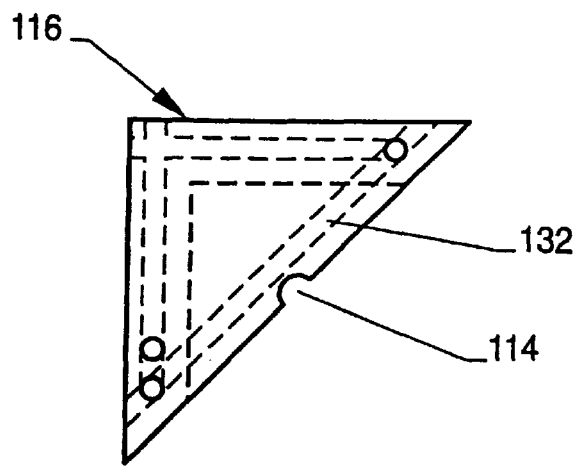
FIG. 3A is a partial plan view showing the cooling system in one-half of the top wall of the apparatus shown in FIG. 2.
Figure 3B:
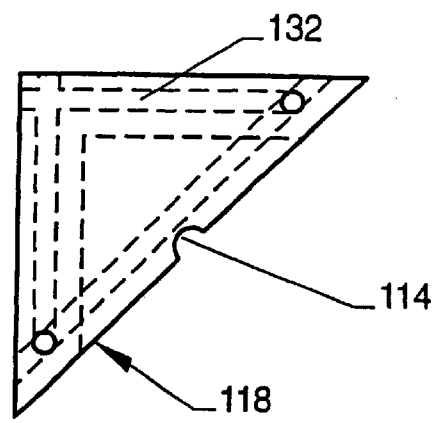
FIG. 3B is a partial plan view showing the cooling system in one-half of the bottom wall of the apparatus shown in FIG. 2.
Figure 3C:
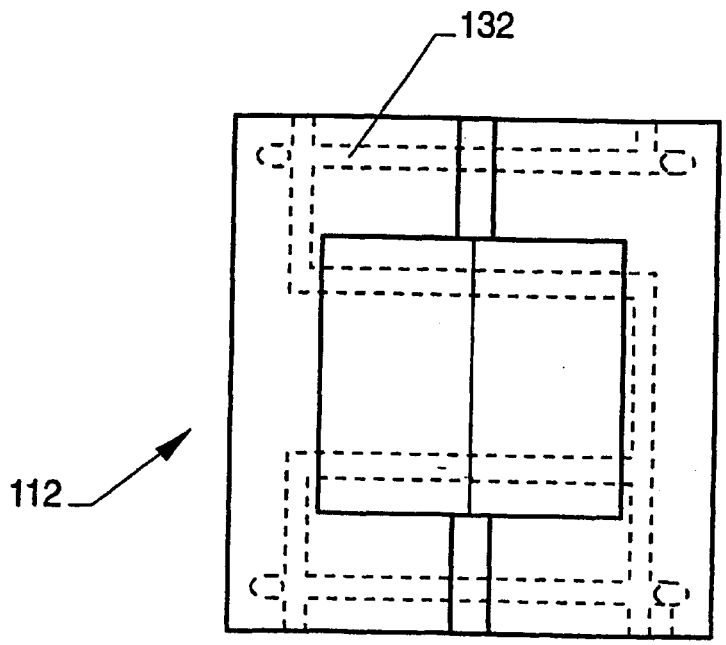
FIG. 3C is a longitudinal plan view showing the cooling system in one-half of the device shown in FIG. 2.

The invention disclosed herein generally embodies the provision of an apparatus and method of manufacturing optical waveguides that comprises non-optically measuring the average temperature of a moving optical waveguide fiber as it exits a heated draw furnace using a temperature device or monitor. In particular, the invention provides an apparatus and method of measuring an average temperature of a moving optical waveguide, where the radiant energy emitted by the moving optical waveguide is not directly optically processed by a device having any optical components, such as lenses. Rather, the invention provides an optical waveguide temperature monitor and a method of measuring the average temperature of a moving optical waveguide by non-optically detecting the radiant energy emitted by the moving optical waveguide and non-optically measuring the heat flux radiated by the moving optical waveguide within a chamber that is adapted to receive the moving optical waveguide through a central channel. Generally, heat flux is calculated by the formula $HF = \sigma F (T_f^4 - T_s^4)$, wherein $\sigma$ is the Stefan-Boltzmann constant, and F is the calculated view factor for the internal walls to the fiber length enclosed by the walls having a height h, a radius of $r_1$ for the central opening and a radius of $r_2$ for the optical fiber, wherein $r_1 > r_2$. More specifically, the invention provides an optical waveguide temperature monitor for measuring the average temperature of a moving optical waveguide fiber that is drawn from an optical waveguide preform. The optical waveguide is passed through the central channel from the top through the bottom of the chamber. Preferably, each of the side walls of the chamber has a plurality of heat flux sensors/detectors fixed or mounted to the inside of the chamber, preferably, only to the side walls of the chamber. A heat flux sensor absorbs the thermal/radiant energy radiated by an optical waveguide fiber and generates a voltage output signal that is substantially proportional to the heat flux. More specifically, the heat flux sensors used in the invention are differential thermopiles that are sensitive to all wavelengths of energy, and in a preferred embodiment, surround the optical fiber so that a maximum amount of radiant energy from the optical waveguide can be detected and measured. Accordingly, the heat flux sensors absorb the maximum amount of energy radiated by the optical waveguide, and generate an output signal, namely, a voltage signal that is substantially proportional to the amount of heat flux or thermal/radiant energy absorbed by the heat flux sensors. In particular, the amount of heat flux radiated from a length of optical waveguide within the chamber is proportional to the temperature of a length of the optical waveguide fiber to the fourth power. Also, since the amount of heat flux absorbed by any surface is a function of the surface temperature, monitoring and controlling the surface temperature of the heat flux sensors is necessary. Accordingly, a first surface of the heat flux sensors that faces the central opening is exposed to the thermal/radiant energy radiated by the optical waveguide fiber, whereas, an opposite second surface of each of the heat flux sensors is in thermal contact with the side walls of the chamber. Further, the side walls of the chamber has a cooling system that is designed to substantially maintain a reference surface temperature of $T_s$. Since the second surface of the heat flux sensors is in thermal contact with the side walls, the second surface of the heat flux sensors is also substantially maintained at the temperature of $T_s$ by the cooling system. As such, a temperature gradient develops between the first and second surfaces of the heat flux sensors, that is, across the thickness of each of the plurality of thermopiles and this temperature gradient is translated into an output/voltage signal that is proportional to the thermal/radiant energy absorbed, that is, the heat flux measured by the heat flux sensors at the surface facing the central channel of each of the thermopiles. The output signal from a differential thermopile is connected via electrodes/contacts to a readout instrument, preferably, a voltmeter, where the voltage is proportional to the temperature observed. Based on the amount of heat flux absorbed by the heat flux sensors, the average temperature of the optical waveguide can be determined. Additionally, in a prolonged measurement period, the cooling system in the temperature monitor which substantially maintains a reference temperature ensures repeated accuracy of the temperature of the moving optical waveguide.

Figure 5:
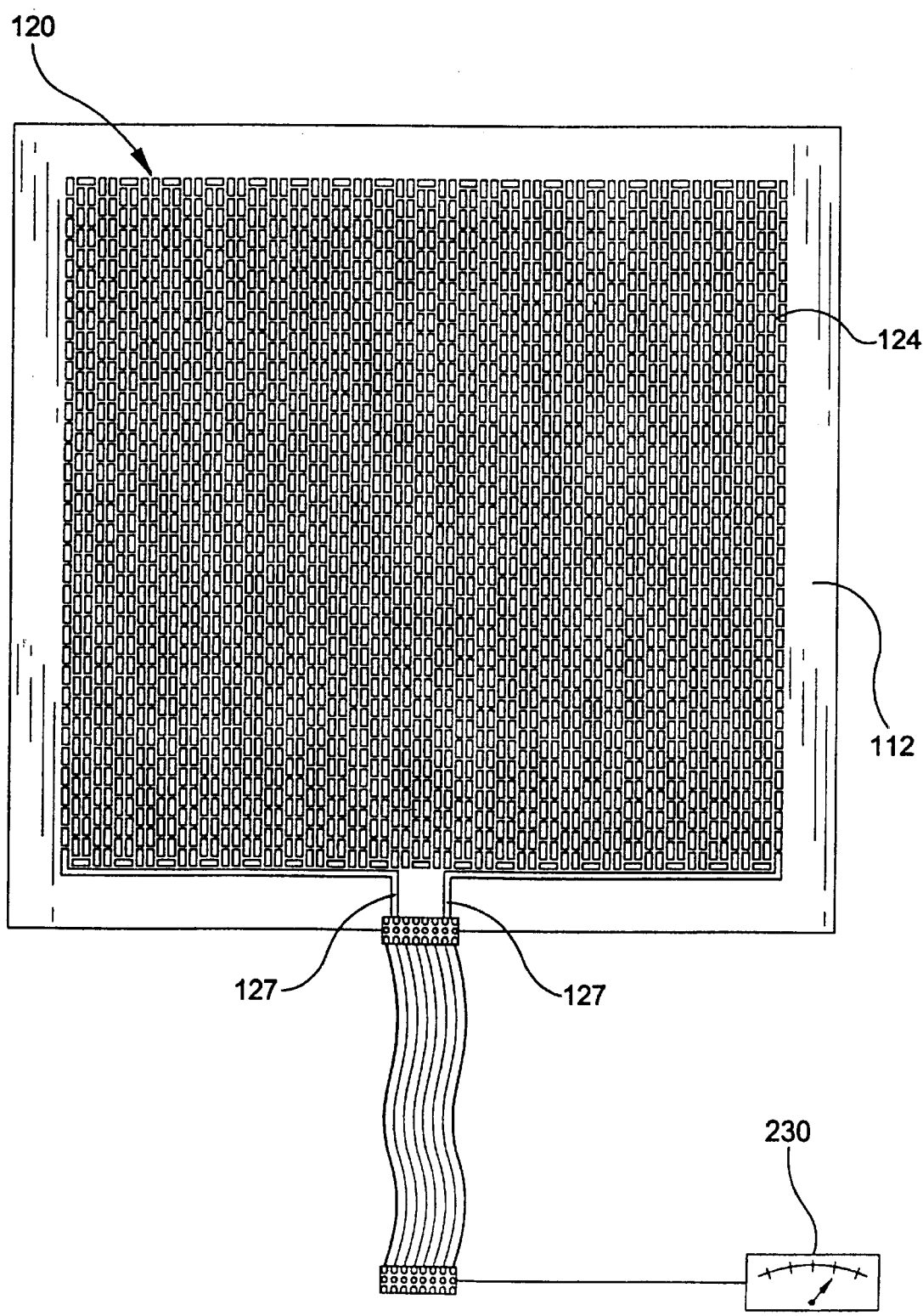
FIG. 5 is a plan view of a heat flux sensor in accordance with an embodiment of the present invention.
Figure 6:
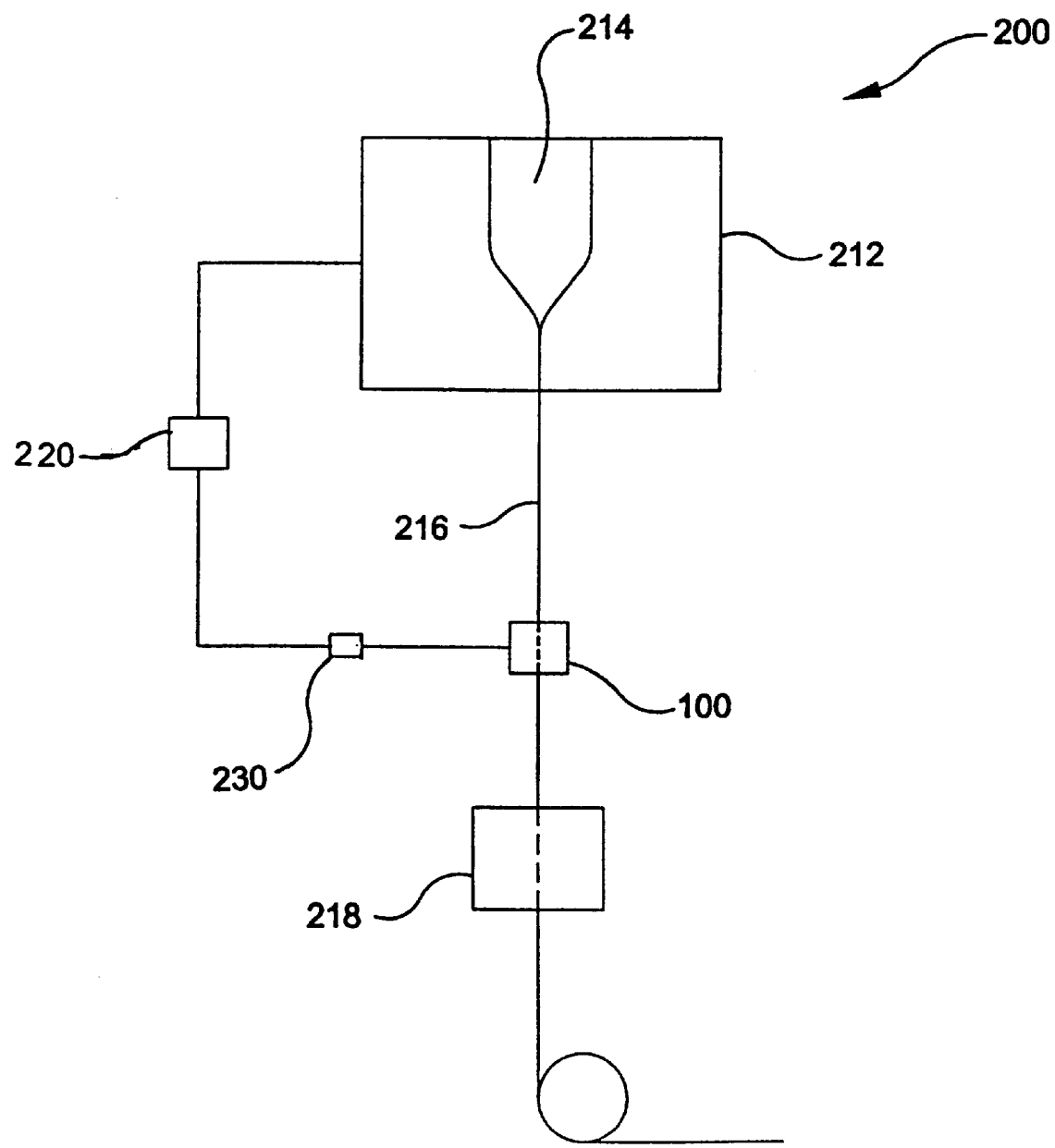
FIG. 6 is a longitudinal cross-sectional view of an optical waveguide manufacturing apparatus in accordance with an embodiment of the present invention.

Referring to the drawings, FIG. 1 shows a perspective view of an optical waveguide fiber temperature monitor 100 for non-optically measuring an average temperature $T_f$ of an optical waveguide fiber 216, whereas, FIG. 6 shows a cross-sectional view of an optical waveguide manufacturing apparatus 200 that incorporates the temperature monitor 100 for non-optically measuring the average temperature of an optical waveguide fiber 216 being drawn from a heated optical waveguide preform 214 in a draw furnace 212 that is heated to a draw temperature of approximately 2000° C. Although the invention is described in terms of measuring the average temperature of an optical waveguide fiber, modifications will be apparent to one skilled in the art to measure the temperature of other types of optical waveguides. As shown in FIGS. 1–6, the temperature monitor 100 comprises a thermally isolated chamber 110 having a plurality of side walls 112 and a central channel 114 that traverses the chamber 110 from a top wall 116 to a bottom wall 118, where the chamber 110 is adapted to receive through the central channel 114 the optical waveguide fiber 216 being drawn. The device 100 further comprises a plurality of heat flux sensors 120, which in a preferred embodiment are differential thermopiles 120 (shown in FIGS. 2 and 5) that are secured to the inner surface of the side walls 112 of the chamber 110. A first surface of each of the heat flux sensors 120 that faces the central channel 114 has a dark absorptive surface 122, which is exposed to the thermal energy radiated by the optical waveguide fiber 216, whereas, a second surface of each of the heat flux sensors 120 is thermally isolated from the first surface and is in thermal contact with the side walls 112 of the chamber 110. The temperature monitor 100 further comprises a cooling system 130 that is in thermal contact with the side walls 112, preferably, built into the side walls 112 of the chamber 110. The cooling system 130 is adapted to substantially maintain the reference surface temperature $T_s$ of the side walls 112 of the chamber 110. Thus, since the second surface of each of the heat flux sensors 120 is in thermal contact with the side walls 112, the second surface is substantially maintained at the reference surface temperature of $T_s$ by the cooling system 130. As such, a temperature gradient develops between the first and second surfaces of the heat flux sensors 120 and this temperature gradient is translated into an output/voltage signal that is proportional to the thermal/radiant energy absorbed or the heat flux measured by all of the heat flux sensors 120. Based on the amount of heat flux absorbed by the heat flux sensors 120, the average temperature of the optical waveguide fiber 216 can be determined. Also, each of the heat flux sensors 120 is serially interconnected to generate an aggregate output signal that is substantially proportional to a maximum amount of radiant energy absorbed by all of the heat flux sensors 120 within the chamber 110. Further, each of the heat flux sensors has an electrode 127 that is connected to a measuring device or readout instrument 230 that registers an aggregate output signal generated by all the heat flux sensors 120. The output signal is proportional to the thermal/radiant energy absorbed by each of the heat flux sensors 120. In a preferred embodiment, the measuring device 230 is a voltmeter 230. However, in an alternate embodiment, the measuring device 230 is a readout instrumentation, preferably, a digital display unit that indicates the heat flux measured by the heat flux sensors 120. Furthermore, preferably, each of the heat flux sensors 120 is first connected to a differential amplifier that amplifies the output signal, which is then measured by a voltmeter 230. Alternatively, each of the heat flux sensors 120 can be individually connected to a measuring device 230 that is connected to a computer system that can compute or add the output signal generated by each of the heat flux sensors 120 and that can display the measured heat flux.

In one embodiment, the cooling system 130 includes a network of channels 132 (see FIGS. 3A–3C) that are built into the side walls 112 of the chamber 110. In particular, the network of channels 132 are adapted to receive a coolant, preferably, water from an external chiller (not shown in any of the drawings), which is attached to the temperature monitoring device 100 via a tap 134 (shown in FIG. 1). The coolant is channeled through the interior region of the side walls 112, thus, substantially maintaining the reference surface temperature $T_s$ of each of the side walls 112, as well as, substantially maintaining each of the second surfaces of each of the heat flux sensors 120 at the reference surface temperature of $T_s$. Also, in a preferred embodiment, the network of channels 132 comprises a plurality of flexible tubes that are adapted to receive a coolant from the external chiller. The coolant received into the channels 132 is substantially maintained at the temperature $T_s$ by the external chiller.

Figure 4:
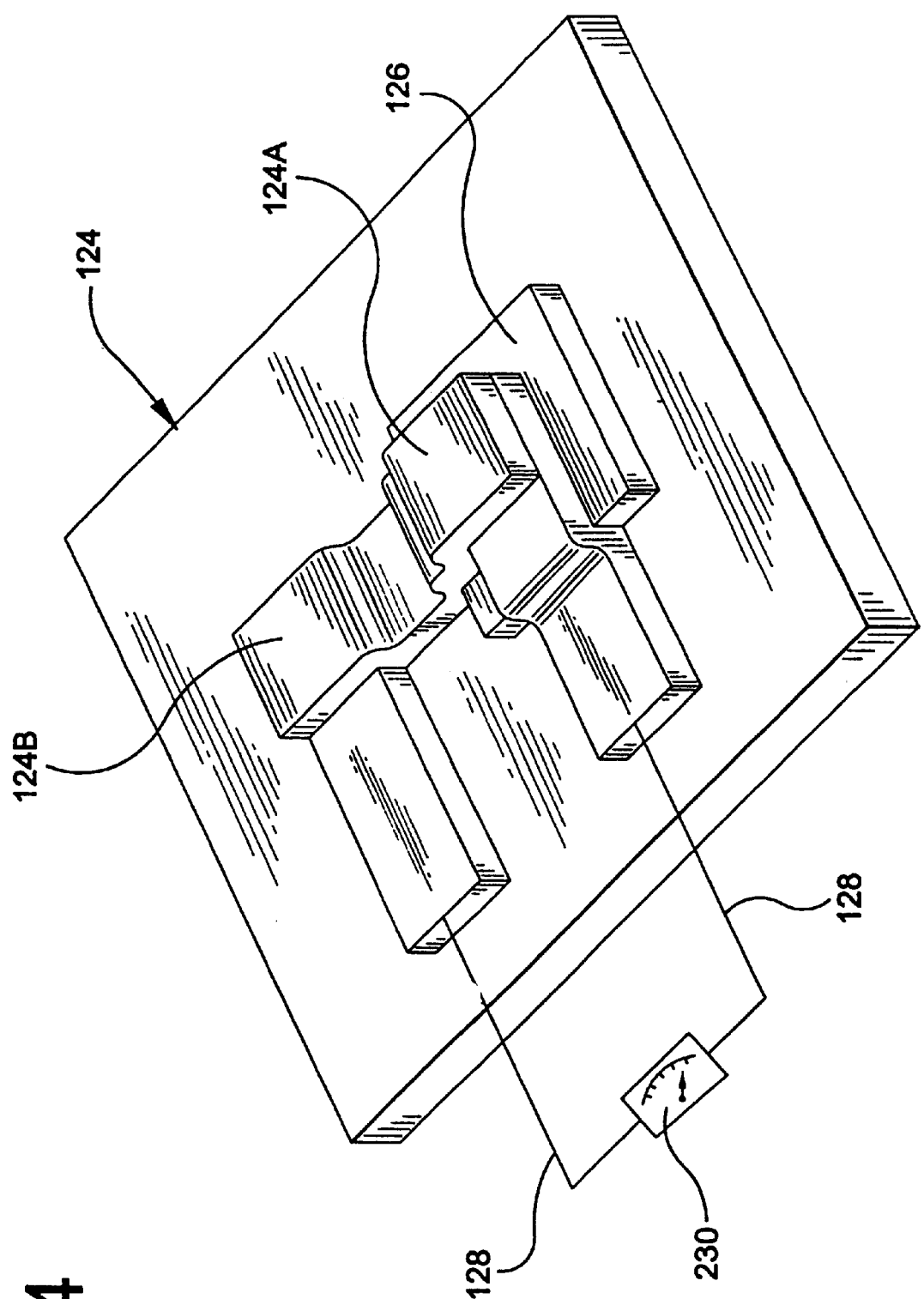
FIG. 4 is a perspective view showing an arrangement of one differential thermocouple pair that is serially interconnected to produce an output signal.

Furthermore, turning to the make-up of the heat flux sensors 120, as shown in FIGS. 4 and 5, each of the heat flux sensors 120 is made up of a plurality of differential thermocouple pairs 124. More specifically, as shown in FIG. 4, a first thermocouple 124A of each of the differential thermocouple pairs 124 is thermally isolated from a second thermocouple 1 24B, with the second thermocouple 124B being in thermal contact with the inner surface of the side walls 112 of the chamber 110. Further, as shown in FIGS. 1, 2, 4 and 5, the differential thermopiles 120 are each serially interconnected to generate an aggregate output signal substantially representative of a maximum amount of radiant energy absorbed by all of the thermopiles 120 within the chamber 110. The aggregate output signal is substantially proportional to the average optical waveguide fiber 216 temperature $T_f$ of a length of the optical waveguide fiber 216 within the chamber 110. In one embodiment, each of the side walls 112 of the chamber 110 comprises a differential thermopile 120 made up of a serially interconnected array of at least 1000 thermocouple pairs 124, preferably, at least approximately 1600 thermocouple pairs 124. The differential thermopiles 120 used in the invention are sold under the trademark EPISENSOR and are commercially available from Vatell Corporation of Christiansburg, Va. However, the differential thermopiles 120 used in the invention differ from the EPISENSOR thermopiles in that the differential thermopiles 120 were modified to exclude an optional foil thermocouple that can be embedded in each of the differential thermopiles 120 and further, the differential thermopiles 120 were constructed such that each thermopile 120 was approximately a two inch square shaped thermopile comprising of approximately 1600 thermocouple pairs 124. The details of the construction of the differential thermopiles is described in U.S. Pat. No. 5,990,412, issued on Nov. 23, 1999, the specification of which is hereby incorporated by reference. The differential thermopiles 120 are constructed using thick film printed ink manufacturing methods. Multiple layers of electrically conductive and dielectric inks are deposited/printed uniformly on a thin and flat anodized aluminum substrate to produce a differential thermopile, as shown in FIG. 5. Accordingly, each of the thermocouple pairs 124 is separated by a thin layer of thermal resistance material. The differential thermopile 120 measures the temperature difference across the thin and flat aluminum substrate. The substrate is oriented normal to a direction of the heat flow and the temperature difference is proportional to the amount of heat flux passing through the substrate. The thin film construction makes these differential thermopiles 120 more rugged and improves their response time. The thermal conductance of the differential thermopiles is at least approximately 64 W/m° K. Further, the differential thermopiles 120 have an adhesive backing on the surface that is in contact with the side walls 112 of the chamber 110. Preferably, the adhesive backing is uniform and free of bubbles, which ensures good thermal contact with the side walls 112 of the chamber 110 and, hence, provides accurate measurements. Moreover, the differential thermopiles 120 have a coating with a high emissivity on the surface that is exposed to the incident radiation. Preferably, the coating is a high temperature black paint having an emissivity of at least 0.94.

Further, in a preferred embodiment of the manufacturing device 200, as shown in FIG. 6, the temperature monitor 100 is in alignment with and located downstream from the draw furnace 212. The temperature monitor 100 further comprises a draw furnace controller 220 (shown in FIG. 6) that has an input from the temperature monitor 100, which allows the controller 220 to maintain the draw temperature of the draw furnace 212. In particular, the measured temperature $T_f$ of the length of optical waveguide fiber 216 is used to control the draw temperature of the draw furnace 212. Also, in another embodiment, the manufacturing device 200 further comprises an optical waveguide fiber coating apparatus 218 (shown in FIG. 6) that is in alignment with and downstream from the temperature monitor 100.

Also, in a preferred embodiment, the chamber 110 has four side walls 112, with each of the differential thermopiles 120 being fixed to one of the four side walls 112, such that the first surface of each of the differential thermopiles 120, which is preferably a dark absorptive surface 122 faces the central channel 114 of the chamber 110 and is exposed to the radiant energy radiated by the optical waveguide fiber 216 within the chamber 110. Moreover, in a preferred embodiment, the chamber 110 is made of a metal having a high thermal conductivity, preferably, in the range of 30 W/m.K to 400 W/m.K, more preferably, a thermal conductivity in the range of 170 W/m.K to 237 W/m.K, and in the preferred embodiment the chamber is made of aluminum. In a preferred embodiment, the temperature monitor 100 is approximately three inches in height with walls that are approximately ½ inch thick. Moreover, the heat flux sensors or the differential thermopiles 120 mounted onto the chamber 110 are squares that are approximately two inches on each side. Further, the diameter of the optical waveguide fiber is approximately 125 microns, whereas, the diameter of the central channel 114 is approximately 0.5 centimeters. In a preferred embodiment, the optical waveguide is approximately an inch away from the center of each of the heat flux sensors 120, and is approximately 1.4 inches away from the edge of each of the heat flux sensors 120. Additionally, in a preferred embodiment, the temperature monitor 100 has a locking mechanism 102 that opens and closes the chamber 110 for receiving the optical waveguide fiber 216 being drawn from the optical waveguide preform 214 within the central channel 114.

In another embodiment, the invention provides an optical waveguide fiber manufacturing device 200, shown in FIG. 6. The manufacturing device 200 comprises of a draw furnace 212 heated to a draw temperature, and an optical waveguide preform 214 positioned within the draw furnace 212, where the optical waveguide preform 214 is heated to the draw temperature. The manufacturing device 200 further comprises a temperature monitor 100 for non-contact and non-optical measurement of an average temperature $T_f$ of an optical waveguide fiber 216 being drawn from the heated optical waveguide preform 214. The temperature monitor 100 is in alignment with and downstream from the draw furnace 212. The temperature monitor 100 (see FIGS. 1–6) comprises a thermally isolated chamber 110 having a plurality of side walls 112 and a central channel 114 that traverses the chamber 110 from a top wall 116 to a bottom wall 118, where the chamber 110 is adapted to receive through the central channel 114 the optical waveguide fiber 216 being drawn from the optical waveguide preform 214. The chamber 110 has a plurality of heat flux sensors 120, with each of the heat flux sensors 120 being mounted onto an inner surface of each of the side walls 112 of the chamber 110. Preferably, each of the heat flux sensors 120 is serially interconnected to generate an aggregate output signal that is substantially proportional to a maximum amount of radiant energy absorbed by all of the heat flux sensors 120 within the chamber 110. The aggregate output signal is preferably substantially proportional to the average optical waveguide fiber 216 temperature $T_f$ of a length of the optical waveguide fiber 216 within the chamber 110. Further, the maximum amount of radiant energy absorbed from the optical waveguide fiber 216 within the chamber 110 is substantially proportional to the fourth power of the average temperature $T_f$ of the length of the optical waveguide fiber 216 within the chamber 110. The temperature monitor 100 further includes a cooling system 130 that is in thermal contact with each of the side walls 112 of the chamber 110. The cooling system 130 is adapted to substantially maintain a reference surface temperature $T_s$, of each of the side walls 112 of the chamber 110.

In a preferred embodiment, each of the heat flux sensors 120 in the temperature monitor 100 is a differential thermopile 120 that is made up of a plurality of differential thermocouple pairs 124. Also, in a preferred embodiment, the network of channels 132 comprises a plurality of flexible tubes that are adapted to receive a coolant, preferably, water from the external chiller. The coolant received into the channels 132 is substantially maintained at the temperature $T_s$, by the external chiller. The construction of the temperature monitor 100 in the optical waveguide fiber manufacturing device 200 is in accordance to that described herein above.

Also, in a preferred embodiment, the chamber 110 has four side walls 112, with each of the differential thermopiles 120 being fixed to one of the four side walls 112, such that the first surface of each of the differential thermopiles 120, which is preferably a dark absorptive surface 122 faces the central channel 114 of the chamber 110 and is exposed to the radiant energy radiated by the optical waveguide fiber 216 within the chamber 110. In a preferred embodiment, each of the side walls 112 of the temperature monitor 100 comprises at least 1000 differential thermocouple pairs 124, preferably, approximately 1600 differential thermocouple pairs 124. Furthermore, in a preferred embodiment, the temperature monitor 100 further comprises a locking mechanism 102 that opens and closes the chamber 110 for receiving the optical waveguide fiber 216 being drawn from the optical waveguide preform 214. Also, preferably, the optical waveguide fiber manufacturing device 200 further comprises a draw furnace controller 220 for maintaining the draw temperature of the draw furnace 212, where the draw furnace controller 220 includes an input from the temperature monitor 100, as shown in FIG. 6. Thus, the measured temperature $T_f$ of the optical waveguide fiber 216 is used to control the draw temperature of the draw furnace 212. In addition, optical waveguide fiber manufacturing device 200 further comprises an optical waveguide fiber coating apparatus 218 that is in alignment with and downstream from both the draw furnace 212 and the temperature monitor 100, respectively. In yet another embodiment, the optical manufacturing device 200 further comprises a second temperature monitor 100 that is in alignment with and downstream from the optical waveguide fiber coating apparatus 218.

In another aspect, the invention provides a method of manufacturing an optical waveguide fiber 216, where the method comprises the steps of providing an optical waveguide preform 214, and heating the optical waveguide preform 214 to a draw temperature, and then drawing an optical waveguide fiber 216 from the heated optical waveguide preform 214. The method further includes providing a heat flux chamber 110 having an optical waveguide fiber entrance 113 and an optical waveguide fiber exit 115, and passing the drawn optical waveguide fiber 216 through the entrance 113 and out the exit 115 of the chamber 110. Finally the method includes the step of non-optically measuring the heat flux radiated by the optical waveguide fiber 216 within the chamber 110. Preferably, the step of non-optically measuring includes the steps of serially interconnecting an array of heat flux sensors 120 to an inner surface of a plurality of side walls of the heat flux chamber 110, and providing a cooling system 130 that is in thermal contact with the plurality of side walls 112 of the heat flux chamber 110, where the cooling system 130 is adapted to substantially maintain a reference surface temperature of each of the heat flux sensors 120. The method further comprises adjusting the draw temperature based on a measured heat flux of the of optical waveguide fiber 216 within the chamber 110, where the measured heat flux is proportional to the fourth power of an average temperature of a length of the optical waveguide fiber 216 within the chamber 110.

In yet another embodiment, the invention provides a method of measuring an average temperature $T_f$ of an optical waveguide fiber 216 that is being drawn from a heated optical waveguide preform 214 in a draw furnace 212. The method comprises the step of providing a chamber 110 having a plurality of side walls 112 and a central channel 114 that traverses the chamber 110 from a top wall 116 to a bottom wall 118. The method also includes the steps of serially interconnecting a plurality of differential thermocouple pairs 124 onto a substrate to form a differential thermopile 120, and securely fixing each of the differential thermopiles 120 to an inner surface of each of the side walls 112 of the chamber 110. Further, the method includes serially interconnecting each of the differential thermopiles 120 to a readout instrument that indicates the aggregate output signal generated by the differential thermopiles 120, the aggregate output signal being representative of the maximum amount of radiant energy absorbed by the differential thermopiles within the chamber. The method includes the step of passing the optical waveguide fiber 216 being drawn through a central channel in the chamber 110. The method further includes the steps of maintaining a reference surface temperature $T_s$ of one surface 124B in each of a plurality of differential thermopiles 120, where each of the differential thermopiles 120 is fixed to an inner surface of the side chamber 110 with the one surface 124B of each of the differential thermopiles being in thermal contact with the side walls 112 of the chamber 110. The method further includes generating an aggregate output signal representative of a maximum amount of radiant energy absorbed by the differential thermopiles 120 within the chamber 110. The method further includes, providing a cooling system 130 that is in thermal contact with the side walls 112 of the chamber 110, where the cooling system 130 is adapted to substantially maintain a reference surface temperature $T_s$ of the one surface 124B of the differential thermopiles 120. The method also includes providing within the side walls 112 of the chamber 110 a plurality of channels 132 that are adapted to receive a coolant from an external chiller that maintains the coolant at the temperature $T_s$. Also, in a preferred embodiment, the method includes a first thermocouple 124A of each of the differential thermocouple pairs 124 from a second thermocouple 124B, with the first thermocouple 124A being exposed to the radiant energy radiating from the optical waveguide fiber and with the second thermocouple 124B being in thermal contact with the inner surface of the side walls 112 of the chamber 110. In a preferred embodiment, the method includes providing a chamber 110 that is made of aluminum.

Although a preferred embodiment of this invention and certain variations thereof have been described herein, various modifications and variations will be apparent to those skilled in the art without departing from the spirit or scope of the invention. Thus, it is intended that the present invention cover the modifications and variations of this invention provided they come within the scope of the appended claims and their equivalents.

What is claimed is:

1. A method of measuring the temperature $T_f$ of an optical waveguide fiber being drawn from a heated optical waveguide preform in a draw furnace, said method comprising the steps of:

passing said optical waveguide fiber through a chamber, said chamber being positioned downstream from said draw furnace;

maintaining a reference surface temperature $T_s$ of one surface of each of a plurality of differential thermopiles, each of said differential thermopiles being fixed to an inner surface of said chamber; and generating an aggregate output signal representative of the radiant energy absorbed by said differential thermopiles within said chamber.

2. The method of claim 1, wherein said passing step includes:

providing said chamber having a plurality of side walls and a central channel that traverses said chamber from a top wall to a bottom wall.

3. The method of claim 2, further comprising the steps of:

serially interconnecting a plurality of differential thermocouple pairs to form one of said plurality of differential thermopiles; and securing said one of said plurality of differential thermopiles to an inner surface of each of said side walls of said chamber.

4. The method of claim 3, wherein a first thermocouple of each of said differential thermocouple pairs is thermally isolated from a second thermocouple, said second thermocouple being in thermal contact with said side walls of said chamber.

5. The method of claim 3, further comprising the step of:

serially interconnecting each of said differential thermopiles in said chamber to a voltmeter.

6. The method of claim 5, further comprising the step of:

providing a cooling system that is in thermal contact with said side walls of said chamber, said cooling system being adapted to substantially maintain a reference surface temperature $T_s$ of each of said second thermocouples of said differential thermopiles.

7. The method of claim 6, wherein said providing step includes:

providing within said side walls of said chamber a plurality of channels that are adapted to receive a coolant having an approximate temperature $T_s$.

8. The method of claim 7, wherein said amount of radiant energy absorbed by said differential thermopiles is substantially proportional to the fourth power of the average optical waveguide fiber temperature $T_f$ of a length of optical waveguide fiber within said chamber.

9. The method of claim 8, wherein said chamber is made of aluminum.

* * * * *